US008760520B2

(12) United States Patent
Levin et al.

(10) Patent No.: US 8,760,520 B2
(45) Date of Patent: Jun. 24, 2014

(54) SYSTEM AND METHOD FOR TRACKING AND MONITORING PERSONNEL AND EQUIPMENT (76) Inventors: Eduard Levin, Thornhill (CA); Eugene Rozumovich, Toronto (CA)

(*) Notice: Subject to any disclaimer, the term of this patent is extended or adjusted under 35 U.S.C. 154(b) by 541 days.

(21) Appl. No.: 12/613,705

(22) Filed: Nov. 6, 2009

(65) Prior Publication Data
US 2010/0118149 A1    May 13, 2010

Related U.S. Application Data (60) Provisional application No. 61/112,950, filed on Nov. 10, 2008.

(51) Int. Cl.
H04N 7/18 (2006.01)
(52) U.S. Cl.
USPC ................ 348/169; 340/10.1; 340/572.1
(58) Field of Classification Search
USPC ................ 348/169; 340/572.1–572.9
See application file for complete search history.

(56) References Cited

U.S. PATENT DOCUMENTS

| | | | |
|---|---|---|---|
| 4,903,243 A | 2/1990 | Turner | |
| 5,650,770 A | 7/1997 | Schlager et al. | |
| 5,689,269 A | 11/1997 | Norris | |
| 5,726,663 A | 3/1998 | Moyer et al. | |
| 5,742,233 A | 4/1998 | Hoffman et al. | |
| 5,822,714 A | 10/1998 | Cato | |
| 5,870,029 A | 2/1999 | Otto et al. | |
| 5,929,777 A | 7/1999 | Reynolds | |
| 5,952,959 A | 9/1999 | Norris | |
| 5,963,130 A | 10/1999 | Schlager et al. | |
| 6,005,476 A | 12/1999 | Valiulis | |
| 6,034,603 A | 3/2000 | Steeves | |
| 6,069,564 A | 5/2000 | Hatano et al. | |
| 6,072,429 A | 6/2000 | Crothall et al. | |

(Continued)

FOREIGN PATENT DOCUMENTS

| | | |
|---|---|---|
| CA | 2447975 A1 | 12/2002 |
| CA | 2485195 A1 | 11/2003 |
| CA | 2497629 A1 | 8/2006 |
| CA | 2599363 A1 | 11/2006 |

Primary Examiner — Abdullahi Salad
(74) Attorney, Agent, or Firm — Bereskin & Parr LLP/S.E.N.C.R.L., s.r.l.

(57) ABSTRACT

A system and method are described for using RFID tags to track and monitor personnel and equipment in large environments and environments that are prone to multipath fading. The system scans the environment by selecting local interrogation zones where RFID tags may be located. Multiple antennae are used, each transmitting a portion of an activation signal, such that the activation signal will be formed in the selected local interrogation zone. Different subsets of the antennae are successively selected, each targeting the selected local interrogation zone, to repeat the activation signal for each subset of antenna. RFID tags in the local interrogation zone will receive the portions of the activation signals and process them to determine whether the full activation signal was destined for that local interrogation zone for each of the subsets of antennae. An activated RFID tag will transmit its tag information, including any data collected from sensors connected to the tag, back to the system. The systems and method will use the location information of the various RFID tags in the global environment and combine that with data received through cameras and other sensors to provide a display with the RFID tag location information superimposed. The data collected about various regions of the environment may be transmitted back to the RFID tags to provide the personnel with information about their surroundings.

29 Claims, 12 Drawing Sheets

(56) References Cited

U.S. PATENT DOCUMENTS

| | | |
|---|---|---|
| 6,317,028 B1 | 11/2001 | Valiulis |
| 6,354,493 B1 | 3/2002 | Mon |
| 6,424,264 B1 | 7/2002 | Giraldin et al. |
| 6,476,756 B2 | 11/2002 | Landt |
| 6,545,606 B2 | 4/2003 | Piri et al. |
| 6,570,487 B1 | 5/2003 | Steeves |
| 6,600,443 B2 | 7/2003 | Landt |
| 6,784,813 B2 * | 8/2004 | Shanks et al. ............ 341/53 |
| 6,847,892 B2 | 1/2005 | Zhou et al. |
| 6,917,288 B2 | 7/2005 | Kimmel et al. |
| 6,965,344 B1 | 11/2005 | Halsey et al. |
| 6,972,676 B1 | 12/2005 | Kimmel et al. |
| 7,091,852 B2 | 8/2006 | Mason et al. |
| 7,304,571 B2 | 12/2007 | Halsey et al. |
| 7,323,991 B1 | 1/2008 | Eckert et al. |
| 7,327,251 B2 | 2/2008 | Corbett, Jr. |
| 7,327,252 B2 | 2/2008 | Goehler |
| 7,588,185 B2 | 9/2009 | Berquist et al. |
| 7,605,696 B2 | 10/2009 | Quatro |
| 2006/0192655 A1 | 8/2006 | Levin |
| 2006/0217881 A1 | 9/2006 | Pei et al. |
| 2006/0229032 A1 * | 10/2006 | Ninomiya et al. ............ 455/82 |
| 2006/0279630 A1 * | 12/2006 | Aggarwal et al. ............ 348/143 |
| 2007/0103292 A1 | 5/2007 | Burkley et al. |
| 2007/0103313 A1 * | 5/2007 | Washington ............ 340/572.8 |
| 2007/0115137 A1 | 5/2007 | Lyon et al. |
| 2008/0100706 A1 * | 5/2008 | Breed ............ 348/143 |
| 2008/0121710 A1 * | 5/2008 | Haddock ............ 235/454 |
| 2008/0137589 A1 | 6/2008 | Barrett |
| 2008/0272914 A1 * | 11/2008 | Murray et al. ............ 340/572.1 |
| 2009/0256683 A1 * | 10/2009 | Stephenson et al. ............ 340/10.1 |
| 2010/0073481 A1 * | 3/2010 | Kaltenbach et al. ............ 348/151 |
| 2012/0068825 A1 * | 3/2012 | Leone et al. ............ 340/10.1 |

* cited by examiner

SYSTEM AND METHOD FOR TRACKING AND MONITORING PERSONNEL AND EQUIPMENT

This application claims the benefit under 35 USC 119(e) of U.S. Provisional Patent Application Ser. No. 61/112,950 filed Nov. 10, 2008 incorporated herein, in its entirety, by this reference to it.

FIELD

The described embodiments relate to systems for the tracking of objects and personnel using radio-frequency identification (RFID) devices and video cameras.

BACKGROUND

Objects within a localized area may be tracked using RFID devices that contain an antenna and a transmitter. These devices are commonly referred to as RFID tags or transponders. Typically, RFID tags remain in a passive state until a reader transmits a signal to the tag. Upon activation, the RFID tag will broadcast its response message.

Typical RFID-based location systems utilize signal strength and range and/or time difference of arrival of the signal at multiple antennae. However, these systems are prone to a number of problems. For example, relying on signal strength can be difficult as the signal strength can fluctuate due to multipath fading and other effects. It is labor intensive and time consuming to construct RF maps to account for these multipath effects, and the RF maps may need to be altered if the environment changes. Time difference of arrival systems are also prone to multipath errors and work better in line-of-sight environments.

Where there are a large number of tags to be identified, any of which may be transmitting at the same time, interference between transmitting tags also poses another problem. With a number of tags transmitting it takes longer to resolve the signal from each of the individual tags.

The use of time difference of arrival systems also requires tight synchronization among all of the antennae. Furthermore, the accuracy of these systems is limited by the accuracy of the measured distance between the antennae on which the time difference of arrival calculation relies on. Reliance on measured distances typically limits the application of these systems to a deployment with static antenna locations. Due to this limitation these systems could not be deployed in an ad hoc manner.

The multipath fading effects and line-of-sight requirements provide limitations on the type of environments in which these traditional systems may be deployed. While these systems may prove satisfactory in a warehouse, they are unable to function in environments that contain a number of surfaces that may reflect an RF signal. For example, the current RFID location systems would have great difficulty locating RFID tags contained within a building from a location outside of that building.

Overcoming the above problems of locating RFID tags opens up a number of new applications. When RFID tags can be located over a greater area and throughout building structures there is difficulty in conveying the RFID tag coordinates in a meaningful way to an end-user of the system. While the tags position can be precisely located relative to the antennae, in situations where there is no time to measure distances relative to the antennae some sort of visual indication is required so that an RFID tag can be located relative to a building structure or other elements in the environment.

SUMMARY

Accordingly, in one aspect of the invention, the problems of multipath fading and interference in locating an RFID tag are limited by activating a tag in a local interrogation zone using a number of subsets of the available antennae.

In another aspect of the invention, the RFID tag is configured to receive portions of the activation signal from a series of subsets of the available antennae.

In another aspect of the invention, the problem of deploying an ad hoc RFID location system is addressed by coupling a locating device with each of the antenna to determine the antenna's relative position to the other antenna.

In yet another aspect of the invention, the problem conveying a visual indication to an end-user of the RFID tag location is addressed by displaying a scaled video image with the RFID tag data superimposed thereon to the end-user.

BRIEF DESCRIPTION OF THE DRAWINGS

A preferred embodiment of the present invention will now be described in detail with reference to the drawings, in which.

DESCRIPTION OF EXEMPLARY EMBODIMENTS

Figure 1A:
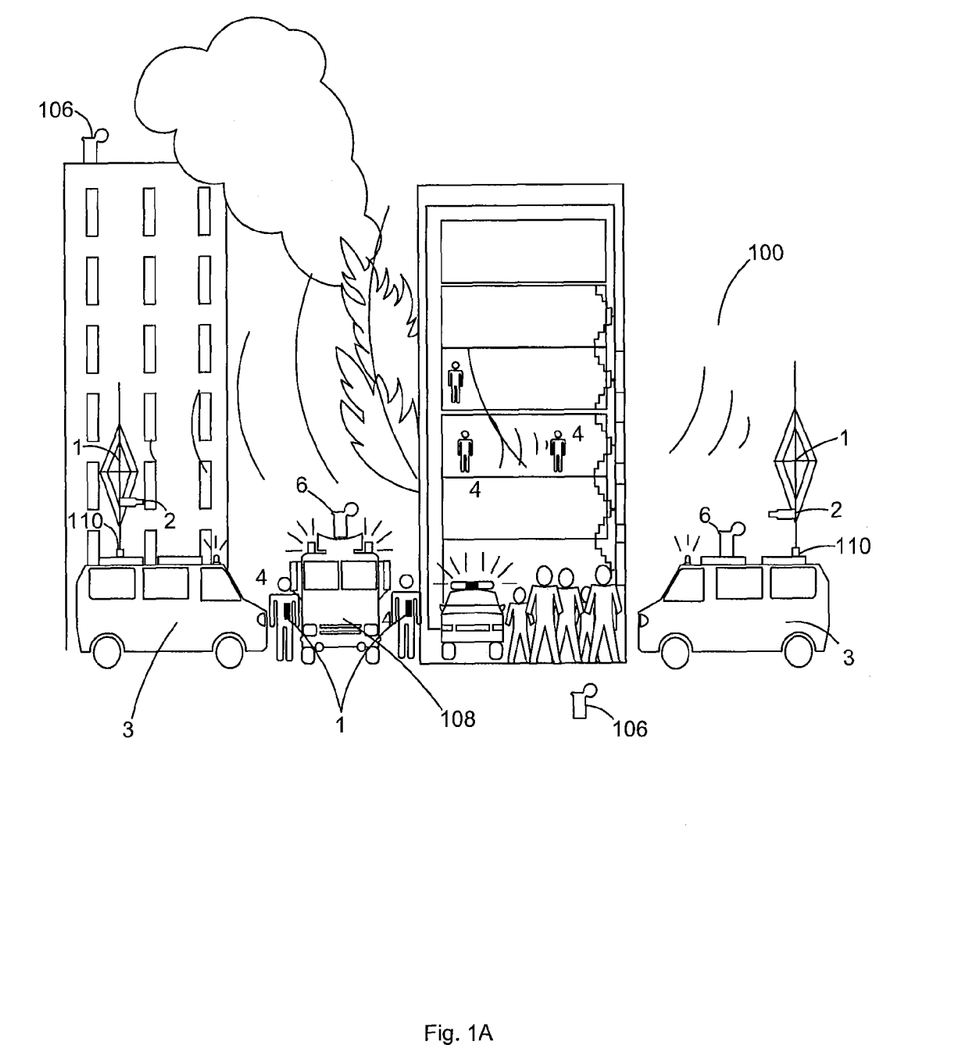
FIG. 1A is a side view showing firefighters located throughout a structure that are tracked according to an embodiment of the invention.

Reference is first made to FIG. 1A, wherein a side view is shown of firefighters located throughout a structure being tracked according to an embodiment of the invention. An emergency fire scene is used as an example of an environment in which an embodiment of the invention may be deployed. Embodiments of the invention may be used that are applicable to different environments such as tracking animal livestock, airport security, or police and military environments.

RFID tracking system 100 is shown consisting of a plurality antennae. Antenna 1 may be mounted on a vehicle 3 or may also be a mobile antenna platform 6. Mobile antenna platform 6 may be mounted on a standalone device, such as a tripod. Any of the antennae may further be equipped with a camera 2. Camera 2 may be a video camera or a still image camera and may be capable of capturing both visible light and infrared images and video. Additional detection antennae 6 may be provided elsewhere, for example as a standalone detection antenna 106 or mounted on a first responder vehicle 108.

In order to track personnel 4 they may be equipped with a personnel module 17 containing an RFID tag. Optionally, RFID tags may also be attached to equipment. Tracked personnel 4 may be located outside and throughout a building. Tracked personnel 4 may be firefighters, police, emergency medical personnel, soldiers or other personnel. The personnel module 17 may be programmed to contain data relevant to the wearer of the device such as a unique identification code, their name, title or any other information relevant to the personnel. Additionally, the personnel module 17 may be connected to a number of sensors to monitor environment variables, vital signs of the personnel, battery level, or any other data that may be relevant depending on the context.

Figure 1B:
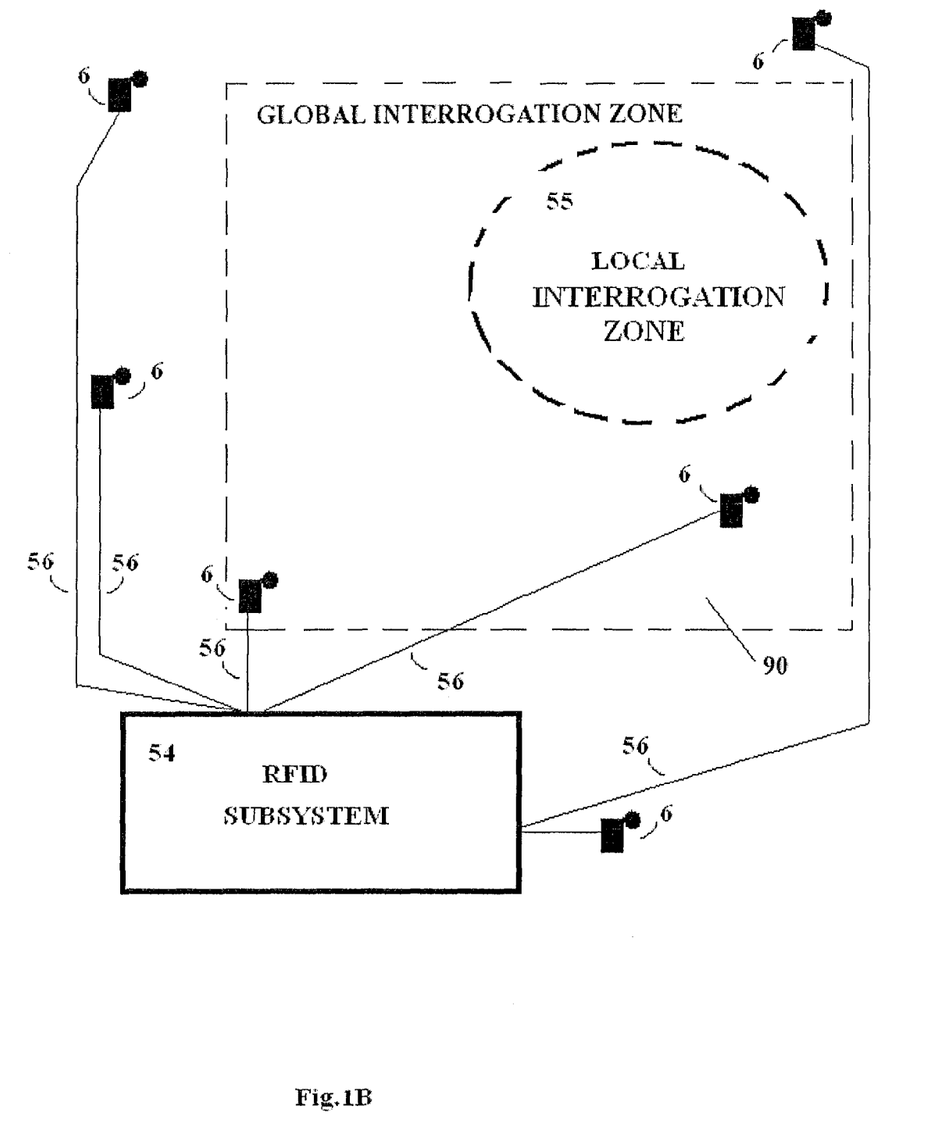
FIG. 1B is a block diagram showing one possible layout of detection antennae according to an embodiment of the invention.

Referring now to FIG. 1B, there is shown a block diagram depicting one possible layout of detection antennae surrounding a global interrogation zone 90 according to an embodiment of the invention. Ideally, the antennae 6 should be spatially separated in a number of dimensions to provide the most accurate detection. To track personnel 4, RFID subsystem 54 selects a local interrogation zone 55 within the global interrogation zone 90. The size of the local interrogation 55 zone may be varied in size and may be selected anywhere within the global interrogation zone. The RFID subsystem 54 then chooses a series of subsets of the antennae to transmit an activation signal to RFID tags within the local interrogation zone 55. The RFID subyetem then assigns a portion of the tag activation signal for each of the spatially separated antennae 6 in the subset. Antennae 6 transmit their respective signals, which are received by personnel modules 17 within the local interrogation zone. The personnel module determines whether it has received the proper tag activation signal from the proper number of subsets of the antennae.

The activated personnel module 17 then transmits a data signal in response to the activation signal. The data signal is preferably received by detection antennae 6 that then communicate the contents of the received data signals to RFID subsystem 54 through communication links 56. Communication links 56 may be wired or wireless. The RFID subsystem 54 stores the coordinates of the local interrogation zone and the information from the received data signal.

Figure 1C:
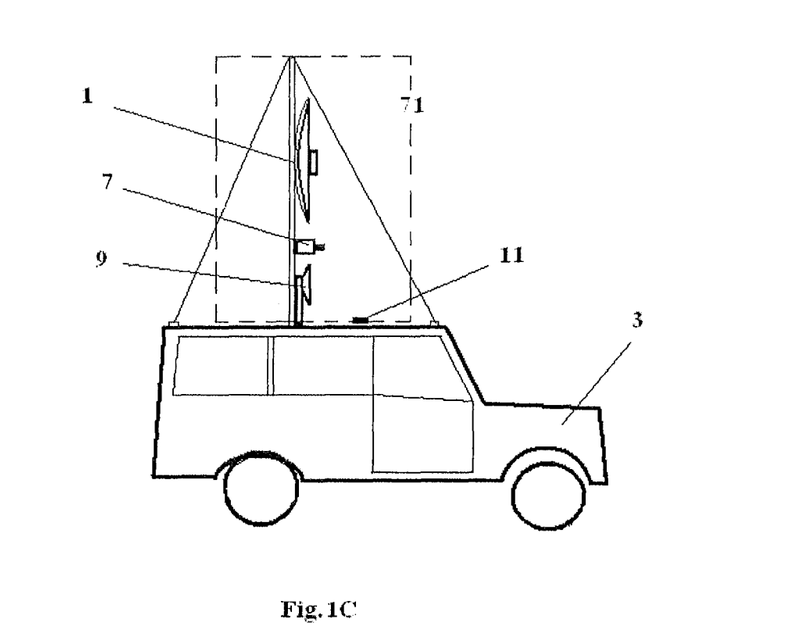
FIG. 1C is a side view of a vehicle equipped with a mobile platform according to another embodiment of the invention.
Figure 1D:
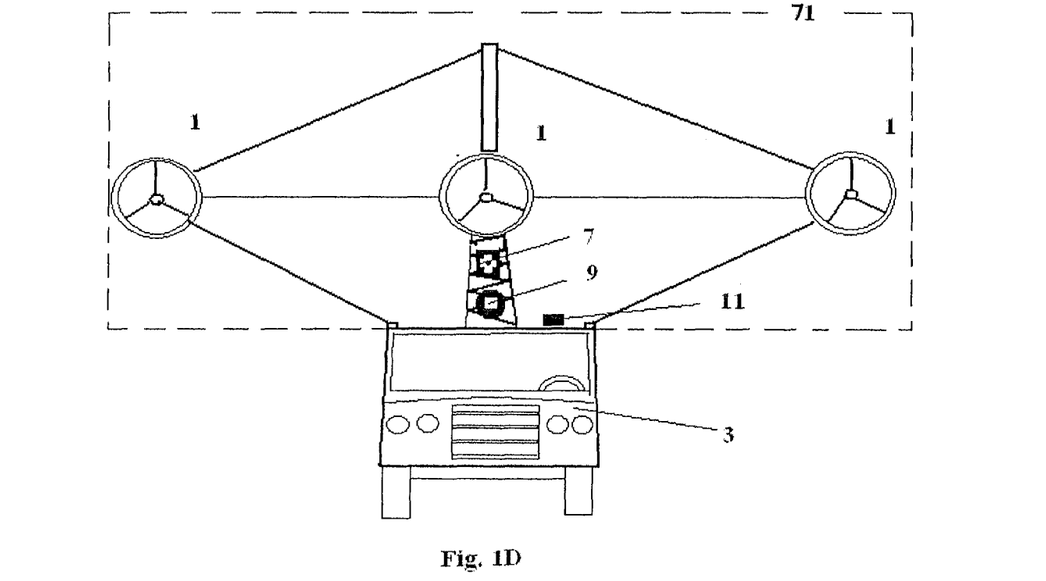
FIG. 1D is a front view of the vehicle shown in FIG. 1C, according to an embodiment of the invention.

Referring now to FIGS. 1C and 1D, there are shown a side and front view of vehicle 3 equipped with a mobile antenna platform 71 according to another embodiment of the invention. Mobile platform 71 may support a plurality of antennae 1, a camera 7, an antenna location device 9, and a GPS receiver 11. Preferably, the plurality of antennae 1 supported by mobile platform 71 are spatially separated as exemplified in FIG. 1D.

Figure 2:
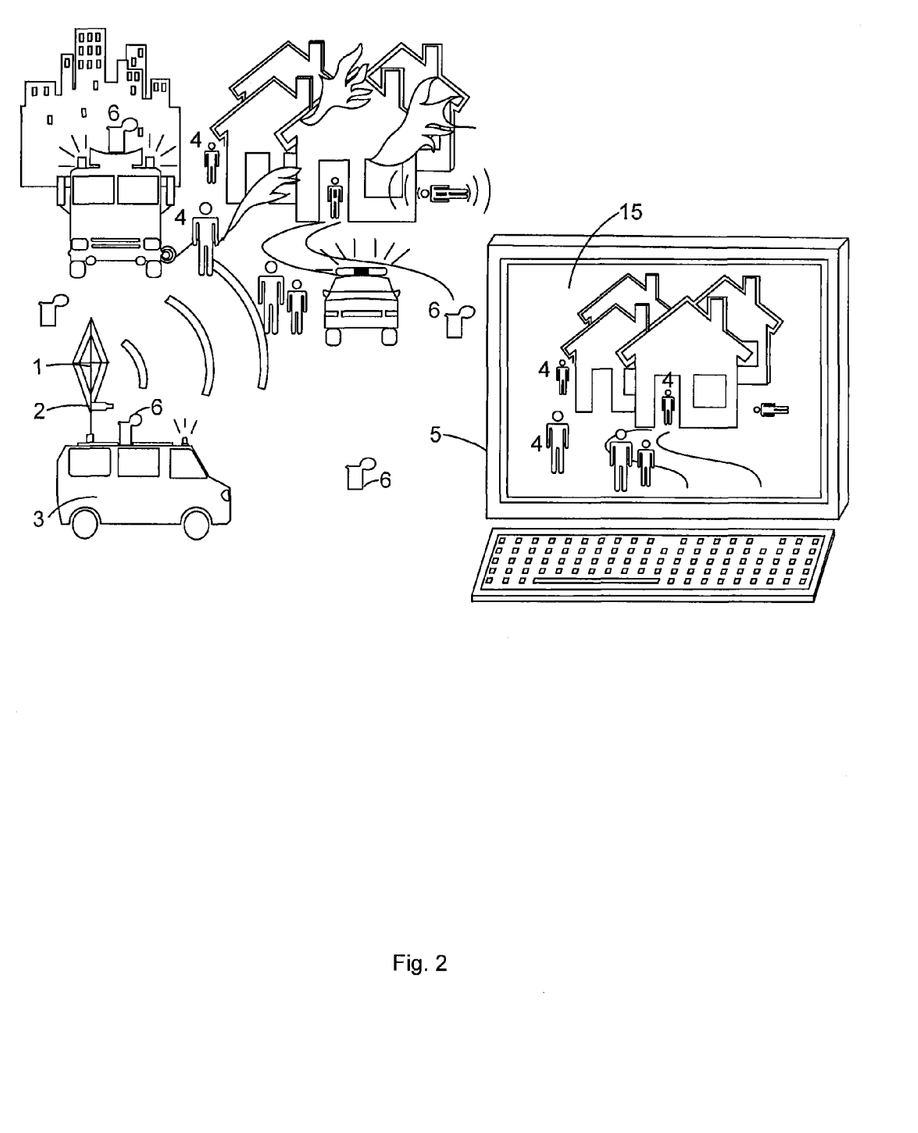
FIG. 2 is a side view showing a display integrating multiple location data according to an embodiment of the invention.

Referring now to FIG. 2, there is shown an interface terminal 5 of RFID tracking system 100. RFID tracking system 100 preferably processes data received from personnel modules 17 and images and video received from cameras 2 to provide an integrated display 15. Integrated display 15 may be configured to show external video, infrared video and sensor data received from personnel modules 17 to form a synthesized, real-time video view of the global interrogation zone. Alternatively, the display 15 may be updated periodically with still images and data. Accordingly, RFID tracking system 100 preferably provides context for location data received from personnel modules 17 by displaying an integrated three-dimensional view of the global interrogation zone. For example, a symbol for a first personnel module 17 located on the outside of a building may be displayed in a first color, while a symbol for a second personnel module 17 located inside a building may be displayed in a second color to indicate a different range. The symbols may be overlaid onto video of the global interrogation zone. Alternately, distinguishable symbols may be used to indicate relative range or occlusion. As another alternative, symbols may be scaled to indicate range.

To provide context for the integrated three-dimensional view, mobile antenna platforms 6 are preferably equipped with radar or laser ranging devices (not shown). Accordingly, the ranging devices scan the global interrogation zone and provide topographical data to RFID tracking system 100 for the purposes of video scaling and location plotting in a composite display.

Additional data channels may be provided to integrate relevant data into the display 15. Such data may include information regarding high-temperature "traps" within a building, locations of hazardous materials, heat sensor data, smoke detector data and radiation sensor data. High-temperature traps, such as an area situated under a source of fire, may be identified through the use of infrared cameras. Accordingly, first responders may use this information to plan ingress and egress from a building in an emergency situation.

Figure 3:
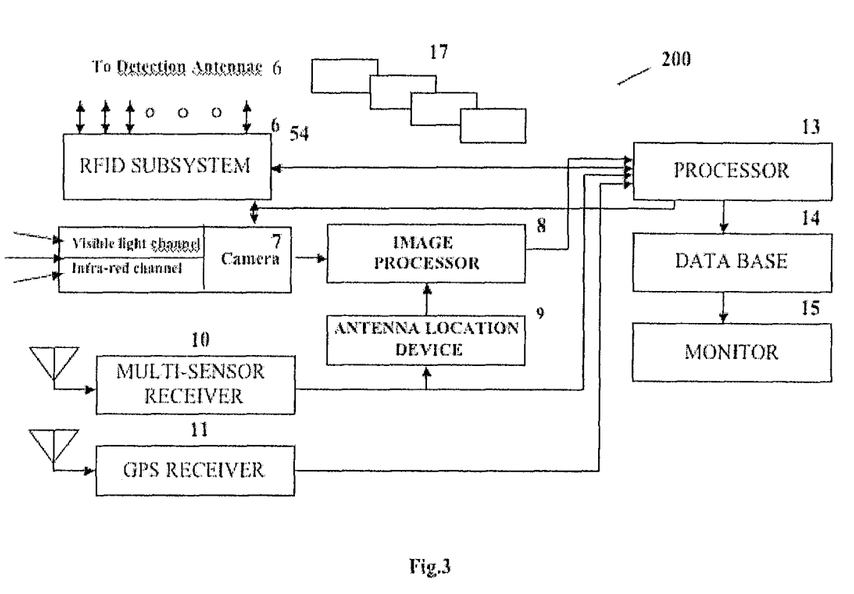
FIG. 3 is a block diagram of the tracking system according to an embodiment of the invention.

Referring now to FIG. 3, there is shown a block diagram of a display subsystem 200 of RFID tracking system 100 according to an embodiment of the invention. RFID subsystem 54 preferably transmits activation signals via antennae 6, which may cause personnel modules 17 to transmit data signals. As exemplified, display subsystem 200 receives data signals with unique identifying information transmitted by personnel modules 17 via detection antennae 6 at RFID subsystem 54. Received data is supplied to processor 13 by RFID subsystem 54. Visible light and infrared video may be received from camera 7 at an image processor 8 and also at RFID subsystem 54 where it may be further supplied to processor 13. An antenna location device 9 preferably performs radar or laser ranging to provide global interrogation zone topographical data to image processor 8. Image processor 8 processes the video using topographical data received from antenna location device 9 to determine the correct image scaling parameters. A multi-sensor receiver 10 may be provided to receive additional information, such as information regarding high-temperature "traps" within a building, locations of hazardous materials, heat sensor data, smoke detector data and radiation sensor data. Data received by multi-sensor receiver 10 is provided to processor 13. A GPS receiver 11 preferably provides location data to processor 13 that may be used to determine the coordinates of a local interrogation zone. Processor 13 operates upon the data received from multiple sources to integrate location data, personnel information and sensor data into a synthesized, composite display. Data may be stored in a database 14 or provided to a monitor 15 for display to a user.

As exemplified, RFID subsystem 54 calculates a local interrogation zone within a global interrogation zone and calculates a corresponding full activation signal and a portion of the full signal to be transmitted by each of a subset of antennae 6, which are connected via a communications link. Antennae 6 may be directional or omni-directional. At least three antennae 6 are required to provide two-dimensional location data with reliable accuracy and recognition probability. At least four or more antennae 6 are required to provide three-dimensional location data with reliable accuracy and recognition probability.

The full activation signal preferably consists of a plurality of pulses, wherein the signal type may be selected from the group consisting of wide-band impulses, an RF carrier with amplitude shift keyed pulses, an RF carrier with amplitude and frequency shift keyed pulses, an RF carrier with phase shift keyed pulses and an RF carrier with a quasi-random signal envelope.

As indicated above, RFID subsystem 54 preferably receives data signals transmitted from individual personnel modules 17, which may be attached to personnel or other objects in a global interrogation zone. Preferably, RFID subsystem 54 processes the received data signals to perform personnel module 17 recognition, calculate personnel module 17 location in the global interrogation zone, and determine ingress and egress times for specific personnel modules 17.

To facilitate processing by RFID subsystem 54, personnel modules 17 are preferably equipped to transmit a radio-frequency signal with a unique identifying code specific to each personnel module 17. Personnel modules 17 may also be attached to other objects, such as equipment, to enable said objects to be tracked independently of personnel. In addition to a unique identifying code, personnel modules 17 may transmit other data, such as a personnel or object description. In some embodiments, data processed by RFID subsystem 54 may be transmitted to specific personnel modules 17, for example to members of a rescue team. Information stored in database 14 may also be transmitted to the personal modules 17 through the RFID subsystem 54 in order to give direction to personnel, for example to avoid high temperature areas or direct personnel to an alternate egress route.

Figure 4:
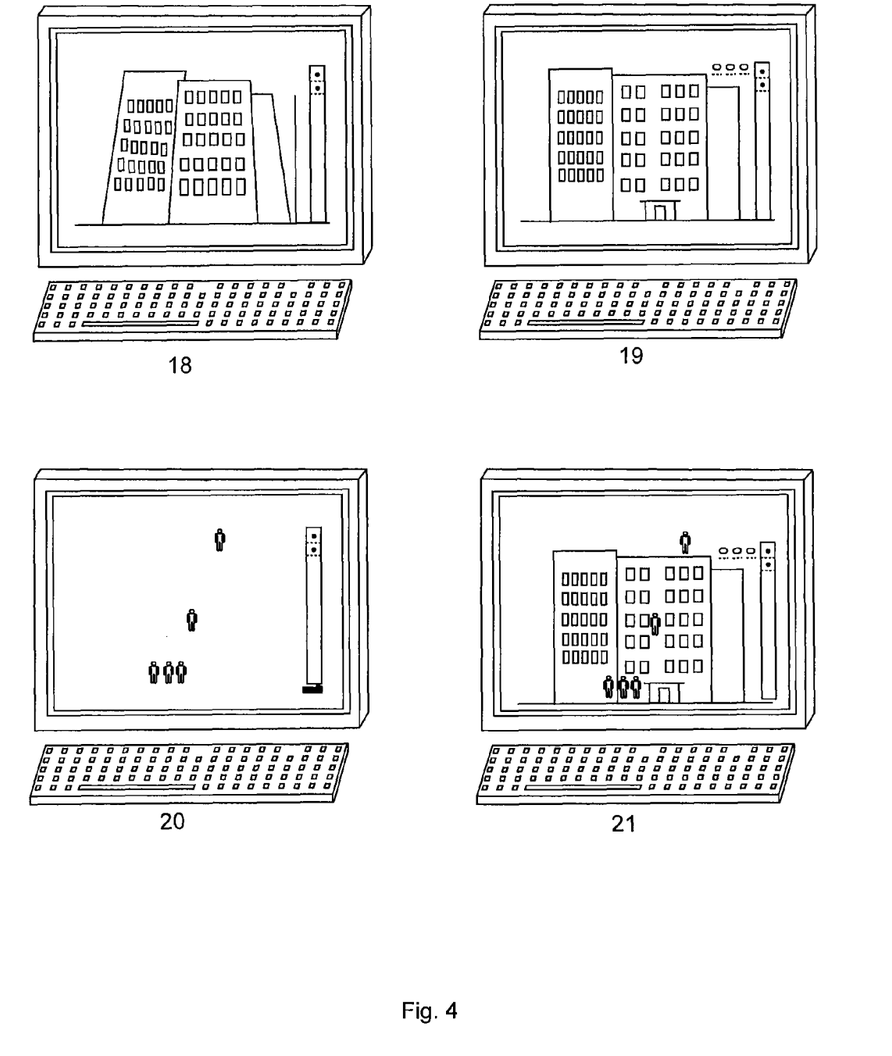
FIG. 4 is a display view showing data that may be integrated in a single display according to an embodiment of the invention.

Referring now to FIG. 4, there is shown a display view showing data that may be integrated in a single display according to an embodiment of the invention. In raw image 18, there is shown unscaled video received at camera 7. The image exhibits skew due to the relative positioning of camera 7. Using data from antenna location device 9, image processor 8 may scale and deskew the video. Data from received from the multi-sensor receiver may also be used to adjust the image. In processed image 19, there is shown a deskewed video image. Preferably processor 13 receives location data from RFID subsystem 54, shown as personnel data image 20 and, together with processed image 19, synthesizes a composite image 21.

Figure 5:
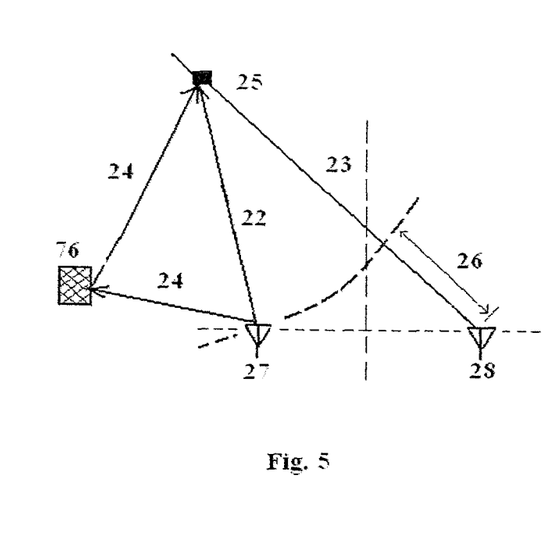
FIG. 5 is a diagram showing signal propagation characteristics according to an embodiment of the invention.

In a radio-frequency system there is some degree of interference from, for example, multipath signal propagation. Accordingly, to reliably activate personnel modules 17 using an activation signal, it is necessary to consider the effect of multipath interference. Referring now to FIG. 5, there is shown a diagram illustrating signal propagation characteristics according to an embodiment of the invention. Omni-directional antennae 27 and 28 transmit a signal in all directions. The signal transmitted from antenna 27 has a direct path 22 and a reflected path 24 to personnel module 25. Reflected path 24 is reflected from object 76. The signal transmitted from antenna 28 has a direct path 23 to personnel module 25. It will be appreciated that the signal transmitted from antenna 28 may also be reflected from object 76 and other objects, however for the purposes of illustration this is not shown.

Radio-frequency waves propagating along signal path 22 travel the shortest distance. Radio-frequency waves propagating along signal path 23 travel the same distance plus an additional distance 26. Additional distance 26 is equal to the difference between the distance of antenna 28 from personnel module 25 and the distance of antenna 27 from personnel module 25. In the event of simultaneous transmissions from antennae 27 and 28, the signal from antenna 27 will arrive at personnel module 25 first and the signal from antenna 28 will arrive at personnel module 25 delayed—relative to the signal from antenna 27—by the time it takes to propagate additional distance 26. Propagation along reflected path 24 may arrive at personnel module 25 at any time after the arrival of the signal along path 22. The time taken for the reflected signal to arrive will vary according to the relative distance of object 76 from antenna 27 and personnel module 25.

In the following example the activation signal may be defined as a pulse followed by another pulse exactly T* seconds later. In order for signals from antennae 27 and 28 to arrive sequentially at personnel module 25, it is necessary for antenna 28 to compensate for additional distance 26 by broadcasting earlier. The time delta for the broadcast is selected so that signals from antennae 27 and 28 arrive sequentially, such as in this example, separated by time T*, in which case, the time delta is subtracted from the predetermined period of the sequential signal.

Figure 6:
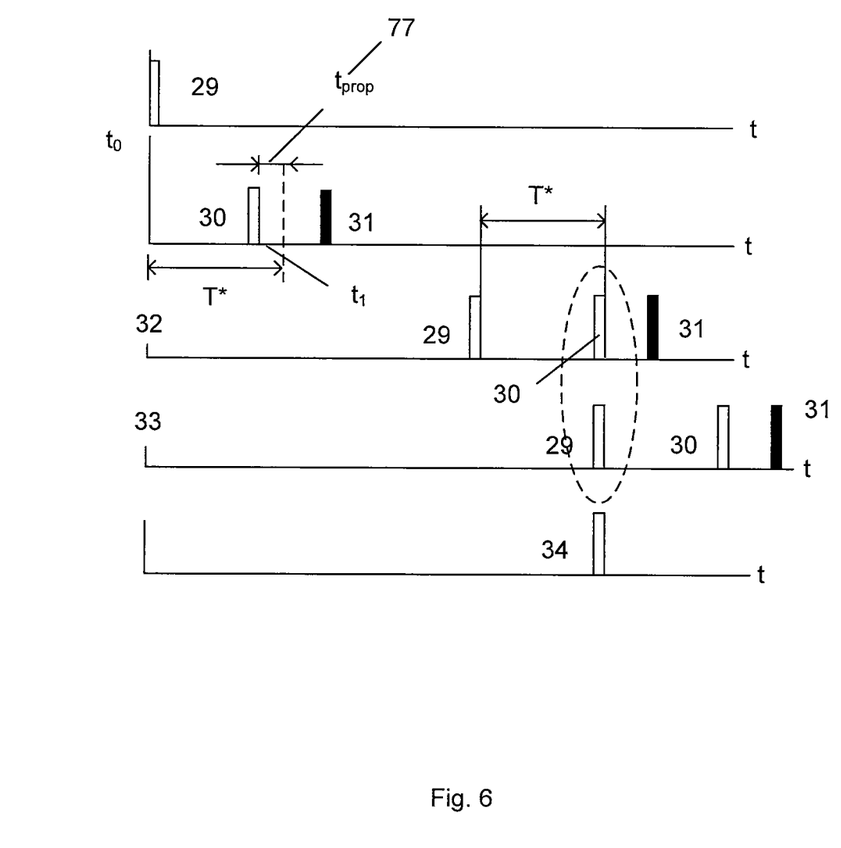
FIG. 6 is a diagram showing signal propagation characteristics over time according to the embodiment of the invention shown in FIG. 5.

Referring now to FIG. 6, there is shown a diagram illustrating signal propagation characteristics over time according to the embodiment of the invention shown in FIG. 5.

A signal, comprising pulse 29, is transmitted from antenna 27 at time $t_0$. At time $t_1$, a pulse 30 is transmitted from antenna 28. Time $t_1$ is equal to $T^*-t_{prop}$, where $t_{prop}$ is the additional propagation time 77 it takes a signal to propagate along additional distance 26. Accordingly, pulse 30 arrives at personnel module 25 T* seconds after pulse 29. A reflected pulse 31, a reflection of pulse 30, arrives after pulse 30 because of the additional propagation time. Reflected pulse 31 creates a problem in activating a specific local interrogation zone as there may be another location within the global interrogation zone where reflected pulse 31 is received exactly T* after another signal pulse thereby matching the defined activation signal.

Figure 7:
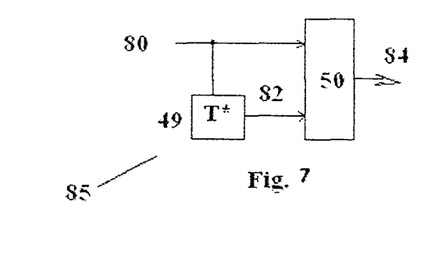
FIG. 7 is a block diagram of a tag activation decoder in accordance with an embodiment of the invention.

Referring now to FIG. 7, there is shown a block diagram of a tag activation decoder circuit 85 that may be prone to errors from multipath effects. A personnel module 25 may be equipped with the tag activation decoder circuit 85 comprising an input line 80 from an antenna and receiver circuit. The signal received from input line 80 and passed to comparison circuit 50 and delay block 49. As exemplified, delay block 49 is be configured to delay the input signal by T* seconds before outputting to comparison circuit 50. Accordingly, if tag activation decoder circuit 85 receives a pulse signal with a period of T* at input line 80, comparison circuit 50 will calculate a positive comparison and activate output line 84. Accordingly, reflected pulse 31 will not interfere with direct pulses 29 and 30 unless it has exactly T* propagation delay. The comparison circuit 50 may be a Logic AND circuit or the personnel module 25 may employ digital signal processing logic to compare the signals and may not require delay block 49.

The tag activation decoder circuit 85 shown in FIG. 7 may be prone to erroneous activation from interfering signals or noise. In order to minimize the effects of multipath signals and noise the number of antennae may be increased where multiple subsets of the antennae are used to activate the personnel module 25. By using multiple subsets of spatially separated antennae the effect of any single object reflecting signals is varied in each of the subsets due to the varying distances to the object from each antennae. Accordingly, the signal processing may be organized as follows:

(a) defining local interrogation zone coordinates according to the relative location of antennae;
(b) choosing a first set of two antennae;
(c) defining a full activation signal;
(d) calculating the subset activation signal and transmit times for each of the antennae in the subset (i.e., the portion of the subset activation signal assigned to each antenna);
(e) transmitting the subset activation signals into the local interrogation zone;
(f) evaluating signals received by personnel modules:
  (i) if the signal consists of repeating pulses with period T*, recording a successful reception;
(g) calculating a full activation signal for a next combination of antennae; and repeating steps (d) through (f) until all combinations of antennae are used;
(h) comparing the number of successful time interval comparisons with the number of antennae combinations:
  (i) if the comparison is successful, transmitting a data signal from the personnel module; and
(j) defining next local interrogation zone coordinates and repeating the activation procedure with different groups of antennae.

It will be appreciated that the number of antennae in a set is not limited to two. Alternately, any number of antennae may be used in a set, subject to the limitation of the number of available antennae.

The maximum possible combinations of "k" antennae, chosen from a set of "n" antennae is given by:

$$C_k^n = \binom{n}{k} = \frac{n!}{k!(n-k)!}.$$

For example, if antennae A, B and C are grouped into subsets of 2 (k=2) and there are 3 antennae available (n=3), then there will be a total of 3 possible combinations of antennae (i.e., A-B, B-C and A-C).

Figure 8:
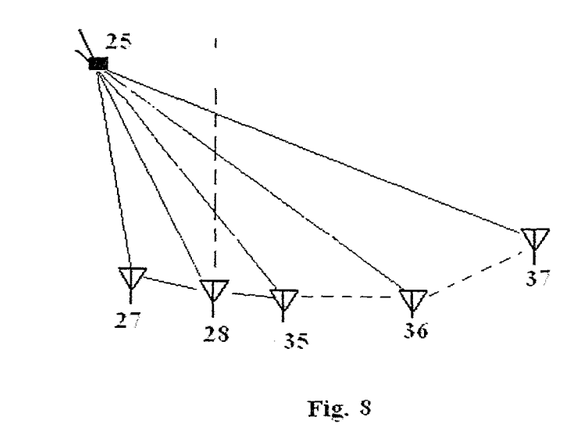
FIG. 8 is a diagram showing an antenna layout according to another embodiment of the invention.

Referring now to FIG. 8 there is shown a diagram with an antenna layout according to another embodiment of the invention. There are shown 5 antennae (n=5). The subset of antennae can contain up to 4 antennae (k=4). As another example, there are 10 possible combinations of 2 antennae subsets that may be selected from the group.

Figure 9:
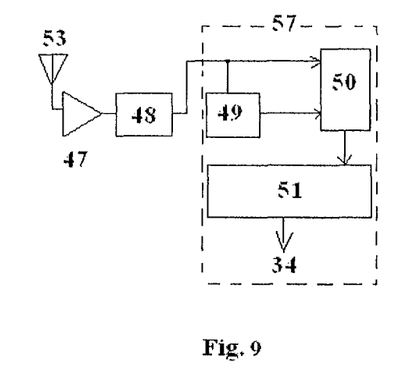
FIG. 9 is a block diagram of a tag activation decoder in accordance with another embodiment of the invention.

Referring now to FIG. 9, there is shown a block diagram of a tag activation decoder circuit 57 in accordance with another embodiment of the invention. A signal is received via antenna 53 and may be amplified by amplifier 47 and demodulated in signal envelope detector 48 before being input to tag activation decoder circuit 57. The input is passed to comparison circuit 50 and delay block 49. Delay block 49 is configured to delay the input signal by T* seconds before outputting to comparison circuit 50. Accordingly, if tag activation decoder circuit 57 receives a pulse signal with a period of T* at the input, comparison circuit 50 will calculate a positive comparison and increments counter 51. If counter 51 reaches a predetermined count within a predetermined time frame, an output signal 34 is activated, triggering transmission of a data signal. The predetermined count does not necessarily have to equal the number of transmitting subsets of antennae. The predetermined count may be a safety threshold to avoid erroneous activation. The counter may be reset prior to sending the activation signal by transmitting a special reset signal from the RFID subsystem, or the counter may simply be reset if the counter is not incremented in a predetermined time.

If tag activation decoder circuit 57 is outside of the local interrogation zone and receives a multipath signal that is T* periodic with another portion of the activation signal, the counter 51 will prevent this multipath signal from activating the tag.

Figure 10:
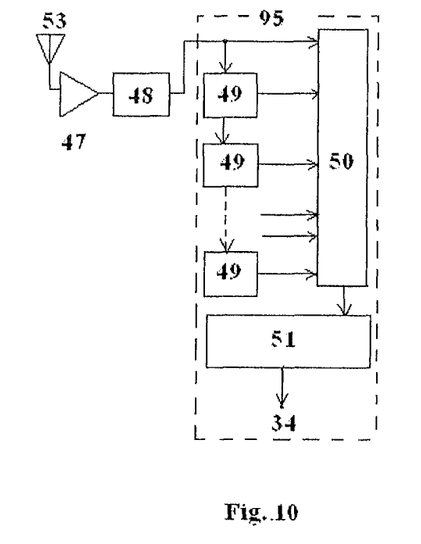
FIG. 10 is a block diagram of a tag activation decoder in accordance with another embodiment of the invention.

Referring now to FIG. 10, there is shown a block diagram of a tag activation decoder circuit 95 in accordance with another embodiment of the invention. A signal is received via antenna 53 and may be amplified by amplifier 47 and demodulated in signal envelope detector 48 before being input to tag activation decoder circuit 57. The input is passed to comparison circuit 50 and delay block 49. Delay block 49 is configured to delay the input signal by T* seconds before outputting to comparison circuit 50 and another delay block 49, up to a predetermined number of delay blocks corresponding to the anticipated number of repeated subset activation signals to be received. Accordingly, if tag activation decoder circuit 57 receives a repeated pulse signal with a period of T* at the input, comparison circuit 50 will only calculate a positive comparison and activate counter 51 after n successive pulses have been received, corresponding to n–1 delay blocks. n is preferably equal to the number of antennae in each combination subset to be the most robust but fewer delay blocks may be used. If counter 51 reaches a predetermined count within a predetermined time frame, an output signal 34 is activated, triggering transmission of a data signal.

In some embodiments the tag activation decoder may be implemented by a digital signal processor that will delay, compare, and count the incoming signals similar to the components described above.

Figure 11:
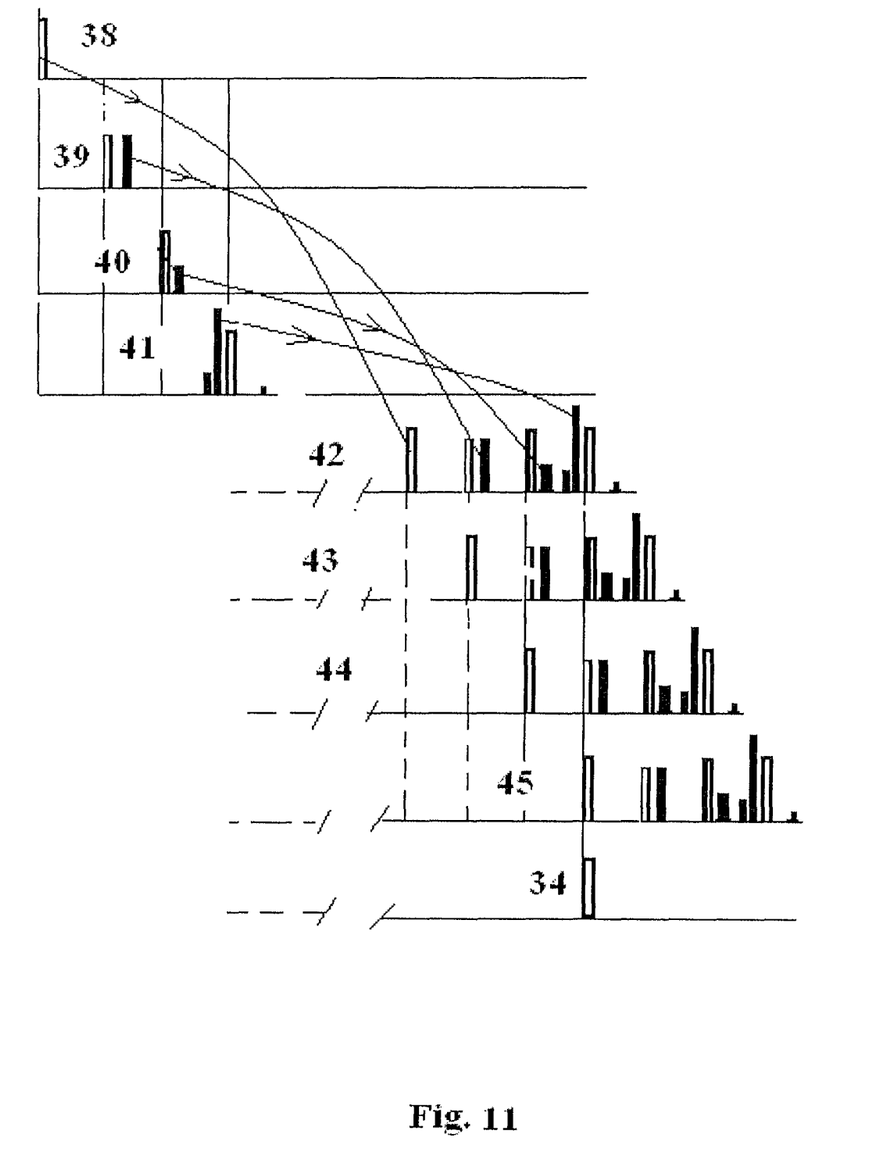
FIG. 11 is a diagram showing the signals transmitted by four antennae and received at a tag according to an embodiment of the invention.

Referring now to FIG. 11, there is shown a diagram illustrating the signals transmitted by four antennae and received at a tag activation decoder circuit according to an embodiment of the invention. Signals 38-41 are ASK activation signal envelopes from each of four antennae. The superposition of these signals is shown without time delay at 42, delayed by T* at 43, delayed by 2T* at 44, and delayed by 3T* at 45. Pulse 34 indicates signal-in-time coincidence, corresponding to a successful comparison at comparison block 50.

Figure 12:
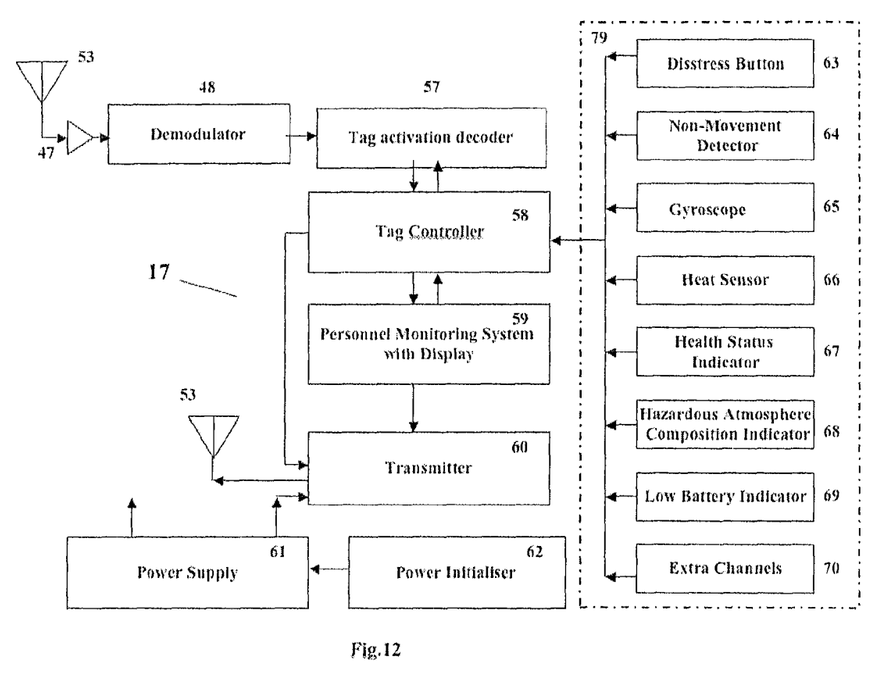
FIG. 12 is a block diagram of a personnel module according to an embodiment of the invention.

Referring now to FIG. 12, there is shown a block diagram of a personnel module 17 according to an embodiment of the invention. Personnel module 17 is preferably comprised of an RFID tag and a data module 79. RFID tag is preferably provided with an antenna 53 coupled to an amplifier 47. An amplified signal is demodulated by the demodulator 48 before being passed to tag activation decoder circuit 57 to determine if the received activation signal is intended for the current RFID tag. Tag activation decoder circuit 57 communicates with a tag controller 58. Tag controller 58 is in communication with personnel monitoring system 59 and transmitter 60. Personnel monitoring system 59 may be configured to receive and display data from the RFID subsystem. The data may include location information of the personnel module 17, nearby colleagues, directions towards egress routes, hazardous areas to avoid, and communication messages to the personnel.

Tag controller 58 is preferably operatively connected to data module 79, which may have auxiliary devices such as: a distress signal initiation device 63, for example, a button to initiate a distress signal; a movement sensor 64 to detect when a wearer of personnel module 17 is inactive or incapacitated; a gyroscope 65; a heat sensor 66; a vital signs sensor 67 to monitor wearer health; an air quality sensor 68 to monitor environmental conditions for toxicity or insufficient oxygen levels; a battery level sensor 69 to warn if personnel module 17 has low remaining battery reserves; and extra channels for other useful auxiliary devices, for example, a metal detector. Data retrieved from auxiliary devices may form a dataset that is preferably stored in a memory (not shown).

A power supply 61 is provided to power transmissions and processing performed by personnel module 17.

Personnel module 17 is preferably configured to receive a tag activation signal; recognize if the tag should be activated or not and transmit a data signal containing identifying information provided by data module 79, such as environmental air quality data, heat sensor data, vital signs data; alerts, escape routes for a wearer of personnel module 17 and for team members. Personnel module 17 may also provide level information for batteries, oxygen and other supplies, and initiate a distress signal.

In one embodiment, personnel module 17 may be coupled to a firefighter helmet or a handheld device to provide location data, map obstacles and dangerous areas, indicate low battery or oxygen levels. A power initializer 62 may be provided to engage the power supply 61 of personnel module 17 before entering into a dangerous area. A gyroscope 65 or accelerometer may be used to detect whether the personnel is in movement or in a horizontal or vertical position.

Figure 13:
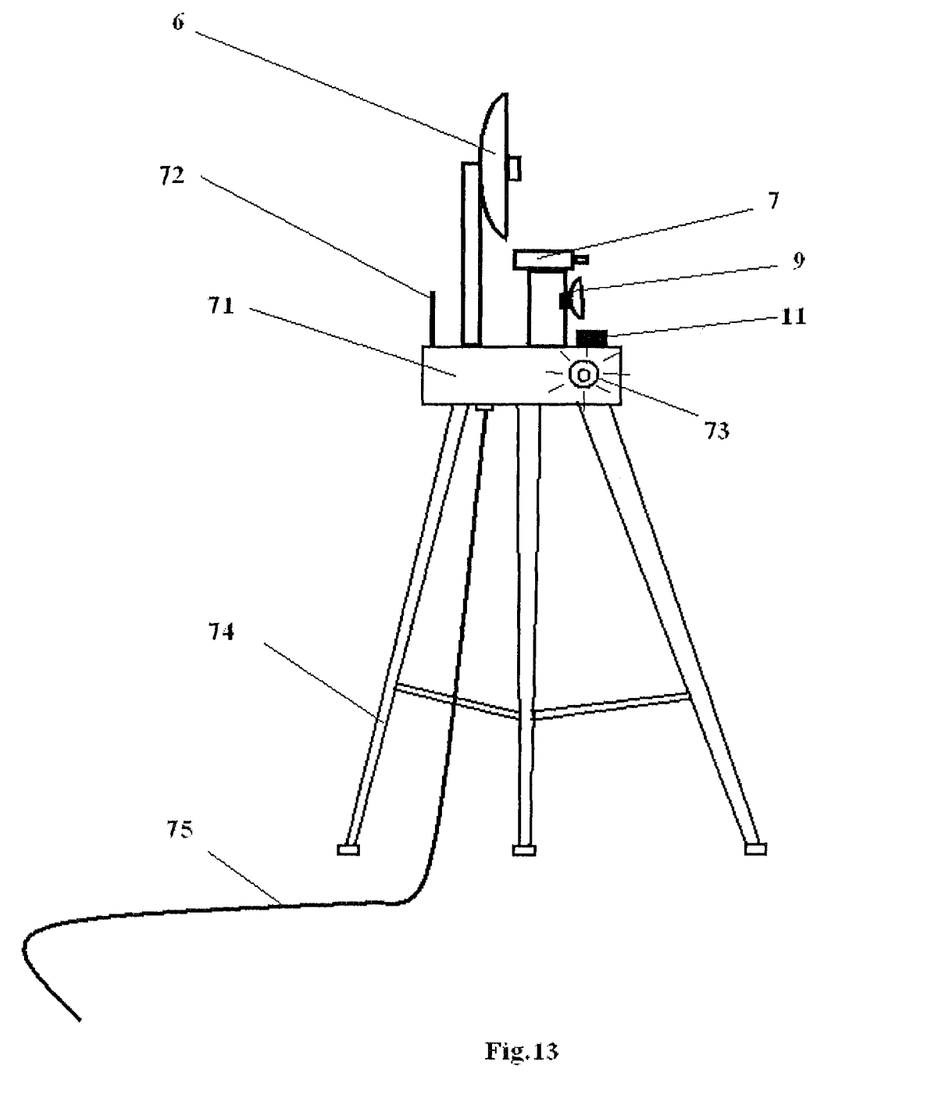
FIG. 13 is a perspective view of a mobile platform according to an alternate embodiment of the invention.

FIG. 13 is a perspective view of a mobile antenna platform according to an alternate embodiment of the invention. In some embodiments, the mobile antenna platform 71 may be permanently mounted on a vehicle 3. In an alternative embodiment, mobile platform 71 may be comprised of a portable platform having a lightweight support structure 74, for example, a collapsible tripod wherein the antenna platform is height adjustable. In addition, the mobile antenna platform may be equipped with a locating device 73, a data-power link 75 and a telecommunications link 72.

The locating device 73, depending on the environment and the required accuracy, may be implemented using GPS, radar, laser, sonar, or other optical devices, for example strobe lights and sensors. Other embodiments that are not required to be deployed quickly may not have a locating device and will rely on an operator to measure and enter coordinates manually.

In operation, greater spatial separation of detection antennae 6 may improve accuracy and reliability of personnel module location. Preferably, antennae are spaced around a local interrogation zone to improve performance.

The present invention has been described here by way of example only. Various modifications and variations may be made to these exemplary embodiments without departing from the spirit and scope of the invention, which is limited only by the appended claims.

We claim:

1. An object monitoring system comprising:
a plurality of antennae;
an RFID tag activator for successively selecting combinations of the plurality of antennae to form a series of antennae subsets, defining a full activation signal for each antennae subset, calculating a portion of the full activation signal for each antenna in the antennae subset, assigning the corresponding calculated portion of the full activation signal to each of the antennae in the antennae subset, and transmitting the assigned portions of the full activation signal from each of the antennae in each antennae subset, such that the assigned portions arrive at a local interrogation zone corresponding to each antennae subset to form the full activation signal in the local interrogation zone; and
at least one RFID tag attached to an object positioned in the local interrogation zone, the RFID tag for transmitting a data signal upon receiving the full activation signal from the antennae subset.

2. The system of claim 1, wherein at least one antenna from the plurality of antennae is coupled to a location device for determining the relative position of the antenna with respect to other antennae.

3. The system of claim 2, wherein the antenna location device is any one of a laser ranging device, a radar, a sonar and a GPS.

4. The system of claim 1, wherein the plurality of antennae are spatially separated.

5. The system of claim 1, further comprising a video monitoring subsystem for superimposing an RFID tag coordinates onto a scaled video image.

6. The system of claim 5, wherein the video monitoring subsystem further comprises at least one of:
a data link;
a global positioning system (GPS) module;
a visible light spectrum camera;
an infrared spectrum camera; and
a location indicator for assisting in visually locating the mobile platform.

7. The system of claim 1, wherein the full activation signal is a plurality of pulses arriving within a defined time.

8. The system of claim 7, wherein the pulses are distinguishable.

9. The system of claim 8, wherein the pulses are distinguishable by channel.

10. The system of claim 1, wherein the RFID tag is coupled with at least one of:
a memory for storing personnel information;
a heat sensor;
a movement sensor;
a vital signs sensor;
an air quality sensor;
a battery status indicator;
a gyroscope; and
a distress signal initiation device.

11. The system of claim 1, further comprising a receiver operatively coupled to the processor for receiving the data signal from each of one or more RFID tags located in the local interrogation zone.

12. The system of claim 11, wherein the processor processes the data signals and stores tag coordinates and received data.

13. The system of claim 1, wherein the full activation signal is selected from the group consisting of wide-band impulses, an RF carrier with amplitude shift keyed pulses, an RF carrier with amplitude and frequency shift keyed pulses, an RF carrier with phase shift keyed pulses and an RF carrier with a quasi-random signal envelope.

14. A method for monitoring objects comprising:
providing a plurality of antennae;
providing at least one RFID tag coupled to each of the objects;
selecting combinations of antennae from the plurality of antennae to form a series of antennae subsets; and
for each antennae subset:
defining a full activation signal;
calculating a portion of the full activation signal for each antenna in the antennae subset;
assigning the corresponding calculated portion of the full activation signal to each of the antennae in the antennae subset; and transmitting the assigned portions of the full activation signal from each of the antennae in the antennae subset, such that the assigned portions arrive in a local interrogation zone corresponding to the antennae subset to form the full activation signal in the local interrogation zone, wherein the local interrogation zone is selected within a global interrogation zone.

15. The method of claim 14, further comprising determining the relative position of at least one antenna from the plurality of antennae.

16. The method of claim 14, wherein the full activation signal is a plurality of pulses arriving within a defined time.

17. The method of claim 16, wherein the pulses are distinguishable.

18. The method of claim 17, wherein the pulses are distinguishable by channel.

19. The method of claim 14, further comprising:
receiving a data signal from an activated RFID tag within the local interrogation zone.

20. The method of claim 19, further comprising receiving the data signal from each of one or more RFID tags located in the local interrogation zone.

21. The method of claim 20, further comprising processing the data signal and storing the tag coordinates and received data.

22. The method of claim 14, wherein the full activation signal is selected from the group consisting of wide-band impulses, an RF carrier with amplitude shift keyed pulses, an RF carrier with amplitude and frequency shift keyed pulses, an RF carrier with phase shift keyed pulses and an RF carrier with a quasi-random signal envelope.

23. A personnel module, the module comprising:
an RFID tag for receiving portions of a full activation signal, each portion being received from an antenna in a plurality of antennae, and transmitting a data signal;
a data module operatively coupled to the RFID tag, the data module for sensing data;
a memory operatively coupled to the data module, the memory for storing data;
processing logic operatively coupled to the RFID tag and data module, the processing logic for combining portions of the full activation signal to form a combined signal, and determining if the combined signal corresponds to an expected activation signal;
wherein each portion is calculated from the full activation signal and assigned to one of the antennae.

24. The personnel module of claim 23, wherein the processing logic further comprises:
a delay circuit operatively connected to the RFID tag, the delay circuit for receiving the combined signal;
a correlation circuit operatively connected to the delay circuit, the correlation circuit for comparing the combined signal with at least one time-delayed copy of the combined signal; and
a counter circuit operatively connected to the delay circuit, the counter circuit for determining the number of successive correlations determined by the correlation circuit.

25. The personnel module of claim 24, wherein the correlation circuit is a Logic AND circuit.

26. The personnel module of claim 23, wherein the full activation signal is a plurality of pulses arriving within a defined time.

27. The personnel module of claim 26, wherein the pulses are distinguishable.

28. The personnel module of claim 27, wherein the pulses are distinguishable by channel.

29. The personnel module of claim 23, wherein the data module further comprises at least one of:
a memory for storing personnel information;
a heat sensor;
a movement sensor;
a vital signs sensor;
an air quality sensor;
a battery status indicator;
a gyroscope; and
a distress signal initiation device.

* * * * *